UNITED STATES PATENT OFFICE 2,078,592

OXIDATION PRODUCTS OF CYSTINE AND RELATED COMPOUNDS AND PROCESS FOR MAKING THE SAME

Gerrit Toennies, Narberth, and Theodore F. Lavine, Ardmore, Pa.

No Drawing. Application December 12, 1934, Serial No. 757,174

10 Claims. (Cl. 260—112)

The present application is a continuation in part of a copending application Serial #658,667 filed by one of us, G. Toennies, for "Oxidation products of cystine and related compounds, and processes for making the same", now Patent No. 2,049,480, dated Aug. 4, 1936. The object of the present invention is the production of disulfoxides of cystine, as well as of other disulfides, for instance, homologues of cystine such as homocystine (Butz and du Vigneaud, Journ. Biol. Chem. 99, 135 (1932) or generally of disulfides of the formula R—S—S—R where R represents radicals containing both amino and carboxyl groups and which radicals are joined to the —S—S— group by a carbon atom which is neither directly joined to oxygen nor nitrogen. Well known disulfides of this type are, for instance, glutathione and insulin.

The method is more particularly of value in cases where the compound to be oxidized is not sufficiently soluble in non-aqueous and non-alcoholic media, but where oxidation in a non-aqueous, non-alcoholic medium is required, either because the starting material is not stable in aqueous or alcoholic solutions or because the disulfoxides or compounds intermediate between the disulfide and the disulfoxide are not stable in aqueous or alcoholic solutions, or because the disulfoxides cannot be isolated conveniently from aqueous or alcoholic solutions. The method is of value also in that it serves in the production of compounds from which by controlled hydrolysis the corresponding acids, known as sulfenic acids, may be prepared, especially in cases where these acids are not accessible by other methods, as is the case with cystine and the other related compounds and corresponding substituted derivatives. The method for the production of disulfoxides, as devised by us, consists in dissolving the disulfide to be oxidized, for instance 1-cystine, in a non-aqueous medium by the use of the technic and reagents outlined in the copending application referred to above.

The method referred to consists in dissolving an equivalent amount of the disulfide in a freshly prepared acetonitrile solution of concentrated aqueous perchloric acid, or other suitable acid, of sufficient acidic strength, such as trichloromethanesulfonic acid. For acetonitrile may be substituted any other non-aqueous, non-alcoholic solvent having comparable di-electric properties and physical constants, which will permit operation under the condition of the example (such as proprionitrile, for instance,) and in which a stable solution can be obtained. When such solution has been obtained, there is added a freshly prepared solution of acetic anhydride in the same solvent, that contains the amount of acetic anhydride equivalent to the amount of water introduced with the acid, according to the equation:

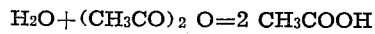

$$H_2O + (CH_3CO)_2O = 2\ CH_3COOH$$

Any anhydride, reacting similarly with water (such as propionic anhydride, for instance) may be substituted for acetic anhydride.

In such a solution, the sulfur compound is oxidized by means of perbenzoic acid (or peracid of similar oxidizing activity, which will not incidentally form water or any other compound which will tend to decompose or react with the desired compounds).

The process and the products herein covered consist chiefly in the adaptation or modification of the copending application for the limitation and control of the oxidation step. In the procedure of dissolving the compound, as described in the preceding application, the step of adding acetic anhydride and waiting for the completion of its reaction with the small amount of water present in the solution may be omitted or, at least, the precise adherence to carefully determined stoichiometric proportions can be avoided, care being exercised to avoid excess of anhydride when the disulfoxide is to be prepared, the disulfoxide not being as reactive with any small or adventitious quantities present as is the disulphone. The omission or modification of this step results in appreciable saving of time and analytical work, without interfering, in the case of 1-cystine, with the production of the desired disulfoxides except for causing a somewhat lower yield, through some incidental losses by hydrolysis.

For the oxidation to a disulfoxide in such a manner that it can be obtained as the principal product of reaction and in a pure state it is essential to carry out the oxidation under such conditions that none or but little of the original disulfide is left unoxidized and at the same time that the amount of the disulfide oxidized beyond the disulfoxide stage (to the sulfoxide-sulfone or the disulfone stage) remains small compared with the amount of disulfoxide formed at the time the oxidation is stopped.

We have found that these relations are chiefly determined by the ratio of oxidant to substrate employed, by the temperature and by the composition of the medium. Conversion of a disulfide into a disulfoxide requires two atoms of oxygen. However, if for each molecule of 1- cystine exactly two molecules of perbenzoic acid or of a peroxide of similar oxidizing power are used, there will be left at the end of the oxidation some unoxidized disulfide due to diversion of a part of the oxygen into oxides higher than the disulfoxide. We have also found that generally the higher the initial ratio of oxidant: substrate, the more completely the cystine will have disappeared at the time the total oxygen consumption has reached two for each cystine used. It was, therefore, the problem to establish the optimum conditions by a proper control of the determining factors for obtaining the right degree of oxidation while yet restraining it within the limits as indicated. Further, with a constant ratio of oxidant: substrate, the cystine will have more completely reacted for any definite total oxygen consumption, the higher the temperature at which oxidation is conducted. Thus, it was found in the case of 1-cystine that at 0° the conditions are more favorable from this point of view than at —10° and again temperatures of 20-25° are more favorable than 0°, taking into account simplification of technique and relative yield.

In the examples given below the optimal conditions, which are determined by the preceding considerations, are disclosed as they were found in our experiments for the production of the disulfoxide of 1-cystine.

When the oxidation has reached the required stage a small amount of a precipitate chiefly consisting of the disulfone perchlorate compound of the previous application above identified will have formed, according to the degree of superoxidation to mono or disulphone formed. This precipitate, under correct conditions of reaction, represents only a small fraction of the original disulfide and its presence may be ignored in the further steps as it is water soluble and due to this property will automatically be eliminated in the further operations.

In the oxidized solution under the conditions of the specific exemplification, the disulfoxide is still contained as a soluble perchlorate. From this solution the free disulfoxide may be isolated by various appropriate means. A crude precipitate, containing the disulfoxide together with small quantities of disulphone and other unidentified by-products is obtained if pyridine is added in an amount at least stoichiometrically equivalent to the perchloric acid used in dissolving the original disulfide. This precipitate, after filtering, washing with acetonitrile, and drying at temperatures below 40°, yields, on repeated careful treatment with moderate amounts of water, the disulfoxide as an insoluble white substance, the by-products of the reaction being easily soluble in water.

An alternate and more convenient method of isolation is as follows: The medium in which the oxidation takes place, consisting chiefly of acetonitrile as exemplified or other solvent of similar properties as elsewhere indicated is adjusted (by addition of a suitable amount of chloroform or another suitable solvent of the type which is non-miscible with water) to such a composition that on addition of an aqueous acid solution separation takes place into two phases with the aqueous forming the lower layer. In this method of isolation, an aqueous acid solution, such as normal hydrochloric acid, is added to the reaction mixture after oxidation has proceeded to the required stage. By shaking, the oxidation products are transferred into the aqueous phase, which is drained off. By repeated extractions the removal of the oxidation products into the aqueous phase is completed and the combined aqueous extracts are then repeatedly extracted with chloroform to remove acetonitrile or any other soluble organic solvent present. The aqueous acid solvent is then neutralized by an alkaline solution such as ammonia to the turning point of congo red. This causes, if the solution is sufficiently concentrated, immediate precipitation of the free disulfoxide.

The oxidation product of 1-cystine which may be obtained by the application of the principles outlined above is characterized as the disulfoxide of the probable composition:

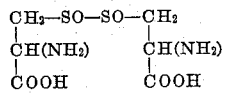

by the results of elementary analysis, by the fact that on oxidation with iodine or bromine, the amount of oxidant consumed is that required for conversion of the disulfoxide to cysteic acid, and by the fact that the compound may be reduced by hydriodic acid to 1-cystine in practically theoretical yield.

By way of illustrating how the principles outlined in this specification may be applied in actual practice the following examples for the production of 1-cystine disulfoxide are given:

*Example 1*

A solution of 1-cystine perchlorate is prepared in the manner described in the preceding application already identified above. After making the concentration of the cystine solution in acetonitrile and of the perbenzoic acid in chloroform such that, after combination of the two solutions, the cystine concentration will be about 0.05 mol., that the perbenzoic acid concentration will be about 0.12 mol. and, if chloroform is used as the solvent for the perbenzoic acid, that the chloroform content of the reaction mixture will not exceed the limit of about twenty-five per cent by volume, the cystine and perbenzoic acid solutions are combined at 20-25° C. and the combined solution is cooled to keep the temperature of the reaction at about 25°. At the time when about two oxygen atoms per molecule of cystine are consumed, which is the case, under the conditions outlined, after about one or two hours of reaction, an amount of pyridine stoichiometrically equivalent to the perchloric acid present is added with shaking. The voluminous precipitate formed is filtered by suction, washed well with acetonitrile and dried in vacuo at temperatures below 40° C.

The precipitate thus obtained is quickly digested with cold water in the ratio of approximately 4 cc. per gram of precipitate until it forms a pasty mass. On filtering by suction and repeated washings with small quantities of water until the wash water is no longer colored 1-cystine disulfoxide remains on the filter as a white substance.

*Example 2*

The oxidation is carried out in a manner similar to that described in Example 1. The amount of chloroform used is adjusted to make the chloroform concentration in the reaction mixture 15% by volume. After about one hour of reaction at about 25° the solution is extracted by shaking with 1 N aqueous hydrochloric acid solution, using about 25 cc. of the latter for each 100 cc. of the oxidation solution. The extraction is repeated several times with 10 cc. portions (per 100 cc. of oxidation solution) of 1 N hydrochloric acid and the combined aqueous extracts are then extracted with chloroform in portions of about 30 cc. per 100 cc. aqueous solution until the chloroform layer shows no change in volume by the extraction. The aqueous solution is then neutralized with five to eight normal aqueous ammonia solution to the point where the color of congo red changes from blue to red. The neutralization is carried out with good cooling and agitation. After about five or ten minutes when the precipitated disulfoxide has settled somewhat it is filtered off, washed with water until white, and dried. (By dissolving in acid and neutralization the compound is obtained in crystalline form.) The whole chain of operations, from the extractions with hydrochloric acid on, should be carried out as rapidly as possible to avoid excessive decomposition.

*Example 3*

The preparation is carried out in the manner described in Examples 1 and 2, except that in the preparation of the solution of 1-cystine perchlorate in acetonitrile the addition of acetic anhydride is omitted.

We claim as our invention:

1. Disulfoxides of disulfides of the general formula R—S—S—R, where R represents the radicals joined to the —S—S— group in cystine and its polypeptide derivatives, said disulfoxides having the general structure R—SO—SO—R.

2. Cystine disulfoxide in the form of a white crystalline powder insoluble in water, having, by elementary analysis, the structure $$[-CH_2-CH(NH_2)-COOH]_2(-SO-SO-)$$

and which may be reduced to cystine by hydriodic acid.

3. In a process for producing intermediate oxidation products of disulfides of the general formula R—S—S—R, where R represents the radicles joined to the —S—S— group in cystine and its polypeptide derivatives, the step which comprises the adjustment of the quantitative relations of the oxidizing agent, in the form of an organic peroxide, to the disulfide, in such a manner that oxidation will be limited substantially to the stage of the disulfoxide.

4. In a process for producing intermediate oxidation products of cystine, the steps which comprise reacting at 20–25° C. with a solution of perbenzoic acid in chloroform upon a solution of cystine in a mixture of a concentrated aqueous solution of perchloric acid and a non-aqueous non-alcoholic solvent which, by virtue of its high dielectric constant, permits ionization and dissociation of the formed cystine perchlorate, and which is non-reactive with any of the chemical groups present in cystine and its oxidation products, and to which mixture is added a quantity of an aliphatic acid anhydride equivalent to the amount of water introduced with the aqueous solution of perchloric acid, the ratio of the oxidant to the substrate being so adjusted that when the solutions are combined the cystine concentration in the reaction mixture will be approximately 0.05 mol., the perbenzoic acid concentration will be approximately 0.12 mol., and the chloroform content will not exceed 25%.

5. In a process for producing intermediate oxidation products of disulfides of the general formula R—S—S—R, where R represents the radicals joined to the —S—S— group in cystine and its polypeptide derivatives, the steps which comprise reacting upon a solution of the disulfide in a mixture of a concentrated aqueous solution of perchloric acid and a non-aqueous, non-alcoholic solvent which by virtue of its high dielectric constant permits ionization and dissociation of the formed disulfide perchlorate and which is non-reactive with any of the chemical groups present in the disulfide and its oxidation products, to which mixture is added a quantity of an aliphatic acid anhydride equivalent to the amount of water introduced with the aqueous perchloric acid solution; with a solution of perbenzoic acid in chloroform, the ratio of the oxidant to the substrate being so adjusted that oxidation will be restrained with the limits required for the disulfoxide, the reaction being permitted to continue until the theoretical amount of oxygen per molecule of disulfide has been consumed, such time being approximately 1–2 hours, within a temperature range of about 20–25° C.

6. In a process for producing intermediate oxidation products of disulfides of the general formula R—S—S—R, where R represents the radicals joined to the —S—S— group in cystine and its polypeptide derivatives, the steps which comprise reacting upon a solution of the disulfide in a mixture of a concentrated aqueous solution of perchloric acid and a non-aqueous, non-alcoholic solvent which by virtue of its high dielectric constant permits ionization and dissociation of the formed disulfide perchlorate and which is non-reactive with any of the chemical groups present in the disulfide and its oxidation products, to which mixture is added a quantity of acetic anhydride equivalent to the amount of water introduced with the aqueous perchloric acid solution; with a solution of perbenzoic acid in chloroform, the ratio of the oxidant to the substrate being so adjusted that oxidation will be restrained within the limits required for the disulfoxide, and the reaction being permitted to continue until the theoretical amount of oxygen per molecule of disulfide has been consumed, such time being approximately 1–2 hours, within a temperature range of about 20–25° C.

7. In a process for producing intermediate oxidation products of disulfides of the general formula R—S—S—R, where R represents the radicals joined to the —S—S— group in cystine and its polypeptide derivatives, the steps which comprise reacting upon a solution of the disulfide in a mixture of a concentrated aqueous solution of perchloric acid and acetonitrile to which is added a quantity of an aliphatic acid anhydride equivalent to the amount of water introduced with the aqueous perchloric acid solution; with a solution of perbenzoic acid in chloroform, the ratio of the oxidant to the substrate being so adjusted that oxidation will be restrained within the limits required for the disulfoxide, and the reaction being permitted to continue until the theoretical amount of oxygen per molecule of disulfide has been consumed, such time being approximately 1–2 hours, within a temperature range of about 20–25° C., and then separating out the formed disulfoxide.

8. In a process for producing intermediate oxidation products of disulfides of the general formula R—S—S—R, where R represents the radicals joined to the —S—S— group in cystine and its polypeptide derivatives, the steps which comprise reacting upon a solution of the disulfide in a mixture of a concentrated aqueous solution of perchloric acid and a non-aqueous, non-alcoholic solvent which, by virtue of its high dielectric constant, permits ionization and dissociation of the formed disulfide perchlorate and which is non-reactive with any of the chemical groups present in the disulfide and its oxidation products, to which mixture is added a quantity of an aliphatic acid anhydride equivalent to the amount of water introduced with the aqueous perchloric acid solution; with a solution of perbenzoic acid in chloroform, the ratio of the oxidant to the substrate being so adjusted that oxidation will be restrained within the limits required for the disulfoxide, the reaction being permitted to continue until the theoretical amount of oxygen per molecule of disulfide has been consumed, such time being approximately 1–2 hours, within a temperature range of about 20–25° C.; adding an amount of pyridine stoichiometrically equivalent to the amount of perchloric acid present, filtering and washing the precipitate with acetonitrile, drying at a temperature less than 40° C., and repeatedly treating with water to isolate the free disulfoxide.

9. In a process for producing intermediate oxidation products of disulfides of the general formula R—S—S—R, where R represents the radicals joined to the —S—S— group in cystine and its polypeptide derivatives, the steps which comprise reacting upon a solution of the disulfide in a mixture of perchloric acid and a non-aqueous, non-alcoholic solvent which by virtue of its high dielectric constant permits ionization and dissociation of the formed disulfide perchlorate and which is non-reactive with any of the chemical groups present in the disulfide and its oxidation products, to which mixture is added a quantity of an aliphatic acid anhydride equivalent to the amount of water introduced with the aqueous perchloric acid solution, with a solution of perbenzoic acid in chloroform, the ratio of the oxidant to the substrate being so adjusted that oxidation will be restrained within the limits required for the disulfoxide, the amount of chloroform being so adjusted that the chloroform content in the reaction mixture will not exceed 15% by volume; the reaction being permitted to continue until the theoretical amount of oxygen per molecule of disulfide has been consumed, such time being approximately 1–2 hours, within a temperature range of about 20–25° C.; thereafter repeatedly extracting the resulting solution with an aqueous hydrochloric acid solution, combining the several extractions thus obtained; and then extracting the combined extracts with chloroform, neutralizing the aqueous solution with a 5 to 8 normal aqueous ammonia solution, with cooling and agitation, and then filtering, washing with water and drying the precipitated free disulfoxide.

10. In a process for producing intermediate oxidation products of disulfides of the general formula R—S—S—R, where R represents the radicals joined to the —S—S— group in cystine and its polypeptide derivatives, the steps which comprise reacting upon a solution of the disulfide in a mixture of a concentrated aqueous solution of perchloric acid and acetonitrile with a solution of perbenzoic acid in chloroform, the ratio of the oxidant to the substrate being so adjusted that oxidation will be restrained within the limits required for the disulfoxide, the reaction being permitted to continue until the theoretical amount of oxygen per molecule of disulfide has been consumed, such time being approximately 1–2 hours, within a temperature range of about 20–25° C.; and then separating out the formed disulfoxide.

GERRIT TOENNIES.
THEODORE F. LAVINE.